United States Patent [19]

Wright

[11] Patent Number: 4,808,204

[45] Date of Patent: Feb. 28, 1989

[54] METHOD AND APPARATUS FOR PRODUCING BENDS IN OPTICAL FIBERS

[75] Inventor: Rustin H. Wright, New York, N.Y.

[73] Assignee: Polysoft Systems Corp., Baltimore, Md.

[21] Appl. No.: 66,150

[22] Filed: Jun. 25, 1987

[51] Int. Cl.$^4$ .............................................. C03B 37/14
[52] U.S. Cl. .............................................. 65/1; 65/12; 65/13; 65/268; 65/281; 65/292; 425/384; 425/392
[58] Field of Search ........................ 65/2, 3.4, 4.3, 102, 65/103, 174, 177, 268, 276, 275, 281, 1, 12, 13, 292, 293; 264/1.5, 1.6, 2.7, 285, 292; 350/96.29; 118/32, 44, 56, 500, 503; 425/384, 392

[56] References Cited

U.S. PATENT DOCUMENTS

| | | | |
|---|---|---|---|
| 2,265,070 | 12/1941 | Goode ................................... | 65/281 |
| 3,776,539 | 12/1973 | Curtis et al. ........................... | 65/281 |
| 4,160,006 | 7/1979 | Patzner et al. ........................ | 264/292 |
| 4,364,788 | 12/1982 | Bloodworth, Jr. et al. .......... | 264/1.5 |
| 4,432,807 | 2/1984 | Shirasaka et al. .................... | 65/2 |

*Primary Examiner*—Kenneth M. Schor
*Attorney, Agent, or Firm*—Harold H. Dutton, Jr.

[57] ABSTRACT

An apparatus for producing bends in optical bends in optical fibers comprising a pair of plates hingedly connected along one edge of each of the plates so that the plates may lie in face-to-face contact and may be hingedly separated, means defining a cavity between the plates when in face-to-face contact, the cavity having two portions for receiving lengths of a fiber on opposite sides of a bend to be formed, the portions being joined at an apex section, means defining an opening into the cavity at the apex section, a fiber channel in each of the portions, the fiber channels being mounted in the portions for relative movement in the cavity to a desired bend angle while the apex of the desired angle is positioned at the opening in the apex section, and pulling means for acting on an optical fiber in the channels when the plates are in face-to-face contact and thereby positioning a fiber at the desired angle whereby the apex of the bend of the fiber is accessible through the opening; several variations of the apparatus are disclosed along with a method for producing bends in optical fibers using the foregoing apparatus for avoiding signal loss or attenuation through the bends.

18 Claims, 3 Drawing Sheets

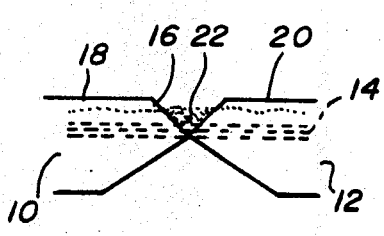 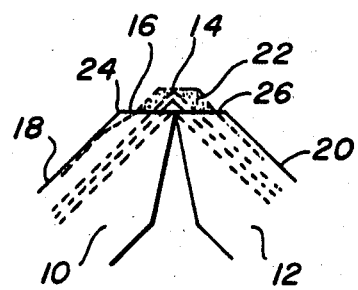 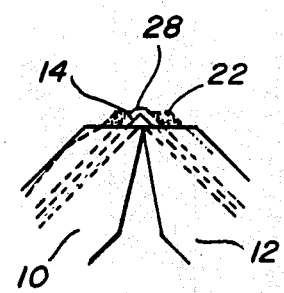
FIG. 1  FIG. 2  FIG. 3
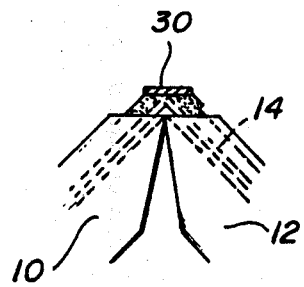 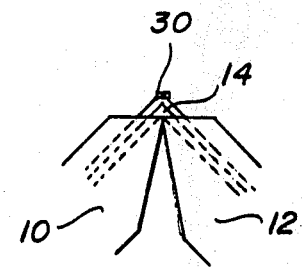
FIG. 4  FIG. 5
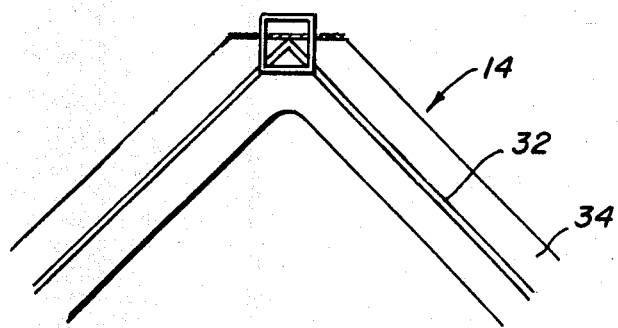 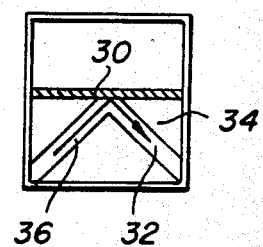
FIG. 6  FIG. 7

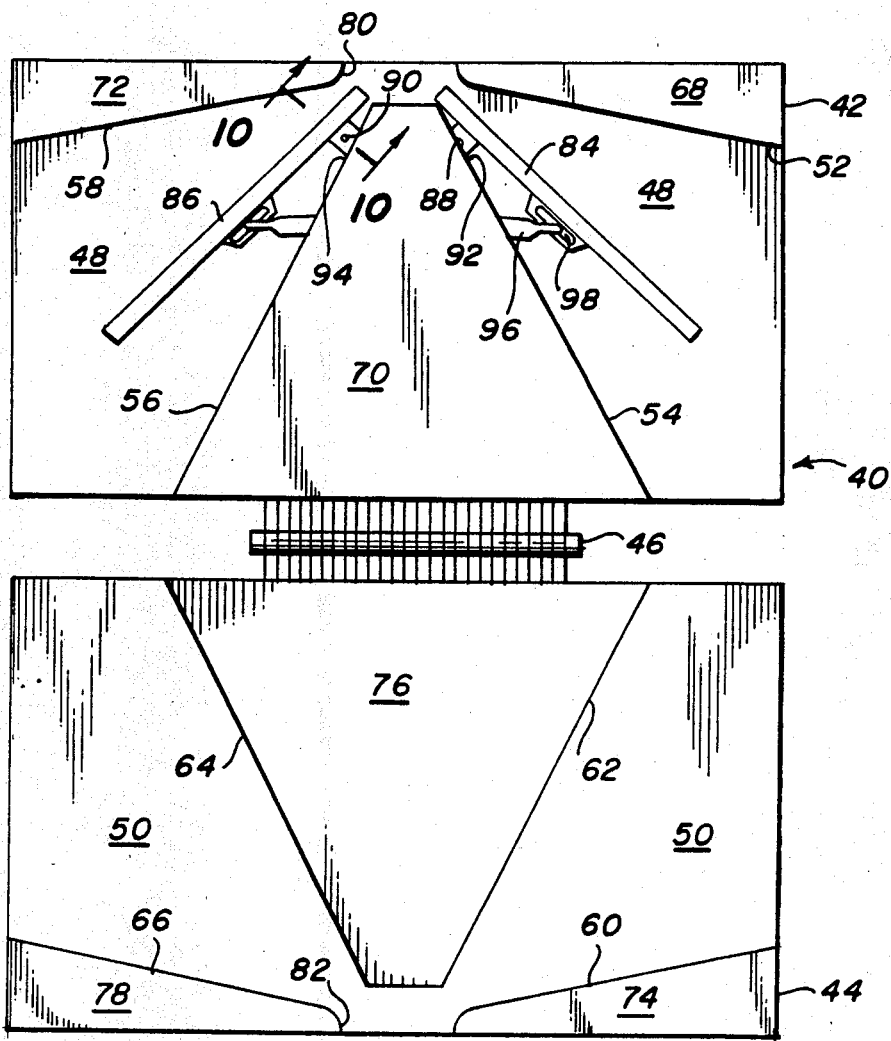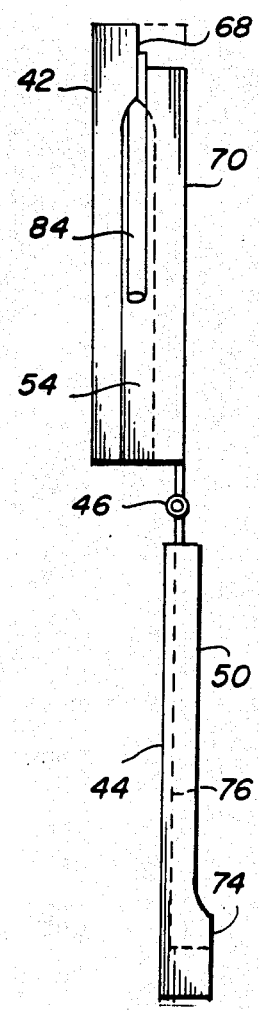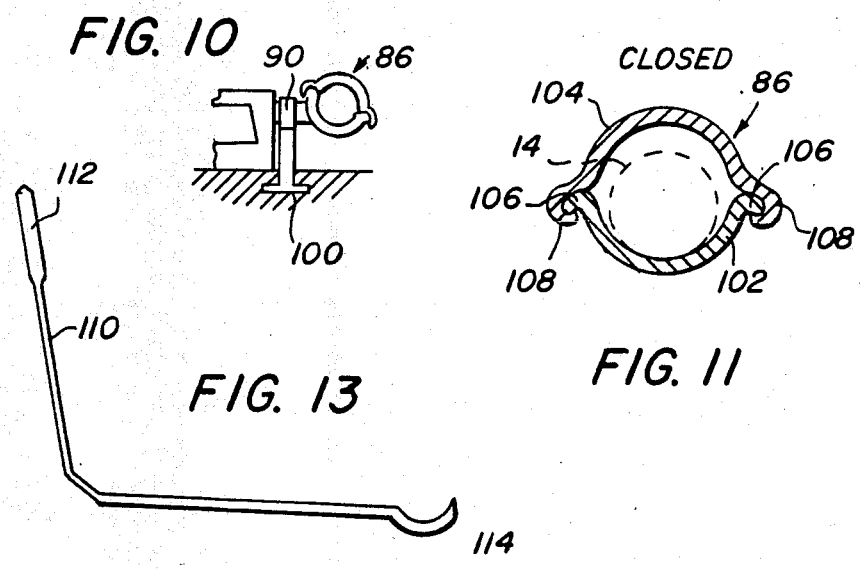

METHOD AND APPARATUS FOR PRODUCING BENDS IN OPTICAL FIBERS

This invention relates to a method and apparatus for producing bends in optical fibers. More particularly, the invention relates to an improved method for making short radius bends in optical fibers whereby little or no signal attenuation results from the bend, as well as apparatus for carrying out this method.

BACKGROUND OF THE INVENTION

1. Field of the Invention

Optical systems are becoming more and more widely used for signal transmission lines, particularly for digital transmission of data bits in telephone systems, data transmission systems, and the like. In many ways, optical fibers have capabilities which far exceed those of electrical wiring. When used for connecting components in optical transmission systems in a small space, a rather significant problem can arise with the optical fibers. Specifically, the optical fibers have a minimum bend radius which will still permit effective data transmission without signal attenuation or loss, and depending upon the diameter of the fiber and the material from which the fiber is made, the minimum effective bend radius may be so great as to cause difficulties in producing small package connection. This is also true in the case of bundled fibers.

Because of the mechanical and optical limitations, a strand of optical fiber can only be bent in gradual curves with a radius of at least about 2 centimeters. But with more and more use of fiber optics, this problem becomes more and more significant, since designers of devices incorporating fiber optics are less willing to allow for such curves at the expense of decreasing the efficiency of the design.

Bent optical fibers have application in numerous fields such as oil well logging cable and light pipes for sensing in hazardous environments such as nuclear reactors, as well as in telephone transmission systems and many other applications. Such fibers are also snugly positioned in connectors of a variety of types, just as with wire conductors.

In connection with the bending of an optical fiber at a sharp angle, two primary problems arise. The first is that in bending the fiber at a short radius, the fiber is likely to be stressed too greatly so as to cause internal fractures. The second problem is that of keeping light from exiting the fiber at the apex of the bend. Internal fractions can cause diffusion, distortion or attenuation of the transmitted light signal, and the light would often exit the fiber if the bend was sharper than the sum of the critical angle of the particular type of fiber and the angle of the beam of light relative to the wall of the fiber. In bundles of fibers, the problems may arise in some of the fibers in the bundle and not in others, and to different extents.

2. Description of Related Art

Very little prior art has dealt with these problems, except to recognize that they exist in order to avoid the need to bend the fibers. U.S. Pat. No. 1,981,999 to French, dated Nov. 27, 1934, discloses an optical telephone system, in which light cables may be bent at an angle and provided with a mirror at the bend to change the direction of the light. The mirror may be curved such spherical or parabolic, or it may be flat. Further, the light cable may be provided with two such bends and mirrors. However, the patent provides no guidance as to how such a mirror would be provided, optical fibers may be quite small in their diametrical dimension, handling of the fibers may be quite difficult. Positioning of the bend is also difficult because of the small size of many such fibers.

U.S. Pat. No. 3,819,250 dated June 25, 1974 to Kibler, discloses a technique for producing a low loss, small radius bend in an optical fiber by controlling the temperature of the fiber using a thermo-electric cooler which causes an increase in the difference between the index of refraction of the core and that of the cladding. After the bend is completed, the fiber returns to its normal temperature, and the conditions for low loss propagation are reestablished.

3. Objects of the Invention

One object of the invention is to provide an improved method for producing small radius bends in optical fibers.

Another object of the invention is to provide improved apparatus for producing bends in optical fibers.

A further object of the invention is to provide an improved method for producing bends in optical fibers which facilitates handling of the fibers during processing.

Still a further object of the invention is to provide an improved apparatus for handling optical fibers for bending the fibers, and providing a mirrored surface at the apex of the bend.

These and other objects and advantages of the invention will become apparent when considered in light of the following description and claims when taken together with the accompanying drawings.

SUMMARY OF THE INVENTION

According to the method of this invention, an optical fiber to be bent is placed into a fiber channel in a bending device. Resin is then cast around the fiber so as to encapsulate or clad the fiber. After the resin is allowed to set, the encapsulated fiber is heated so as to slightly soften the fiber and the resin and the fiber/resin composite is then bent to the desired angle. The heating may also serve to cure the resin so that the composite will then retain the desired angle after the resin is cured.

Next, the apex of the bend is cleaved in such a manner as to expose the fiber at the apex, and the exposed area is then polished. Subsequently, the exposed, polished area is mirrored by a suitable, conventional technique, and after the mirror is applied, the resin coating or cladding is removed, for example with a solvent. The fiber is then removed from the bending device and is ready for use. Optionally, the bend region may be covered with a protective material or coating.

The apparatus for carrying out the bending process includes several embodiments. One of the embodiments is more limited and is more suitable for use on a small scale. This device would include a pair of shaping plates connected by a hinge in a clamshell fashion, and provided with fiber channels in cavities internally of the shaping plates. The shaping plates serve as protective cover during the bending process. The shaping plates have portions which are hollowed out so as to cooperatively provide a cavity therebetween, and the fiber channels are positioned within the cavity, and preferably are pivotally connected to one of the shaping plates. A hole is provided along one edge of the shaping plate device, whereby the fiber is allowed to project slightly beyond the edge of the shaping plates for working. A reference bar may be provided to fit on the edge of the shaping plates, and have a groove in the reference bar over the opening in the shaping plates to control the extent to which the fiber projects. The groove serves to keep the proper amount of fiber projecting from the shaping plate, since the depth of the indentation of the groove in the reference bar would be equal to the amount of fiber to be cut off during the cleaving step. Once the fiber has been bent, it is pushed up into the reference bar until the apex of the fiber is flush with the top of the groove in the bar. The reference bar may be left in place during the resin casting step or may be removed before the resin is molded, as preferred.

The fiber channels generally comprise tubes of a semi-rigid plastic material, for example polyethylene or polyvinylchloride, and are formed as longitudinally split halves. Each of the fiber channels may be easily opened repeatedly to allow the placement or removal of the fibers. The inside diameter of the fiber channels is substantially greater than the diameter of the largest fiber to be used in the bending device, in order to avoid damage to the fibers and to accommodate the placement of the resin used to encapsulate the fiber for working.

A pulling device may also be used to ensure that the bend region of the fiber projects out of the fiber cavity after it has been bent to the desired angle.

A device is included for measuring the angle to be produced in the fiber at the bend, and several variations on this angle measuring device are included within the scope of the invention. One such measuring device includes a central screw and follower connected to the two fiber channels, and connected to a micrometer type of adjustment, whereby rotation of the screw by the micrometer would change the relative angles of the fiber channels. The connection between the screw can also be a dual rack and pinion type of connection with one rack for each channel or could be a pair of connecting links extending from the fiber channel to a follower collar threadedly engaging the central screw.

The second embodiment of the bending apparatus includes a pair of shaping plates, the plates being connected also by a hinge along one edge, and each of the plates including a plurality of fiber channels which are parallel to each other and normal to the edge along which the hinge is located. A fiber would then lie in any one or more of the channels in each of the plates. In this embodiment, the fiber channels are provided with barbs or other means for holding the fibers and the resin in the channel, and by changing the angle of the plates with respect to each other, the fibers are bent to the angle to which the plates are positioned. A vacuum source may be connected to a manifold arrangement to hold the fibers in the channel while the resin is poured, and in this manner a plurality of fibers may be encapsulated and bent simultaneously.

After bending, the fibers project slightly from the juncture of the two plates, to facilitate the cleaving of the fibers. The cleaving of all of the fibers may be accomplished by a single pass of the tool used.

After the cleaving operation, the exposed fiber areas are retained in position for polishing, while the fibers are retained in the desired orientation by the resin, and after the polishing, the mirroring is accomplished A vapor deposition technique may be used for applying a mirror finish, or other techniques such as a silvering coating or paint may be used.

Other variations of both the process and the apparatus will become apparent from the description which follows:

DESCRIPTION OF THE DRAWINGS

The FIGS. 1–5 of the drawings are schematic views illustrating the steps in the process;

FIG. 6 is an enlarged view of a bent fiber;

FIG. 7 is a further enlargement in the vicinity of the apex of the bend;

FIG. 8 is a plan view of one embodiment of the apparatus with the device open;

FIG. 9 is a side elevation of the device of FIG. 8;

FIG. 10 is a section along lines 10—10 of FIG. 8 and viewed in the direction of the arrows;

FIGS. 11 and 12 are cross-sectional schematic views of a fiber channel;

FIG. 13 is a plan view of a pulling device;

DESCRIPTION OF THE PREFERRED EMBODIMENTS

Figure 14:
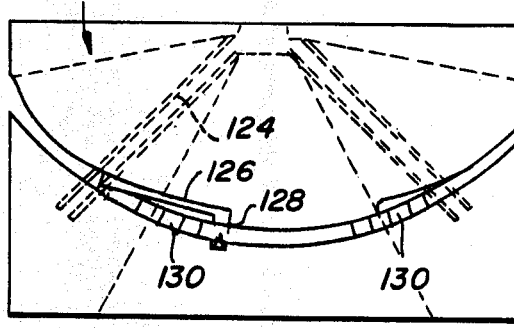
FIG. 14 is a plan view of one form of angle measuring device.
Figure 15:
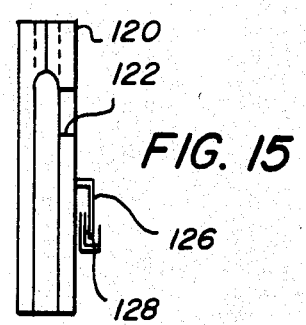
FIG. 15 is a side elevation view of the device of FIG. 14.

With reference to FIGS. 1–5 of the accompanying drawings, there is shown a schematic representation of the steps in the process according to this invention. In FIG. 1, a pair of fiber channels 10 and 12 are shown with an optical fiber 14 positioned therein. The channels are configured in such a way that a V-shaped notch 16 is formed between the top surfaces 18 and 20 of the channels 10 and 12. The optical fiber 14 rests in the channels, and a suitable encapsulating or potting resin 22 is poured in the channels in such a way as to completely encapsulate the optical fiber 14.

The particular resin to be used is not significant from a chemical standpoint, but is significant with regard to the mechanical properties thereof, and may be readily selected by routine experimentation. Specifically, a number of epoxy type resins are suitable. Suitable resins should be of the thermo-plastic type, which may be softened by the application of heat, so as to permit bending of the composite without fracturing the resin. Also the resin should be able to set fairly quickly and have sufficient hardness to hold the fiber in place during working.

Upon the application of heat to the fiber/resin composite to soften the resin and fiber or fibers, the fiber channels 10 and 12 may be pivoted with respect to each other to the position shown in FIG. 2, whereby the fiber and the resin is bent, to a desired angle. At this point, the fiber 14 and the encapsulating resin 22 project slightly above the surfaces 24 and 26 of the channels 10 and 12.

In the next step, appropriate cleaving tool is used to remove the top exposed portion of the resin and to remove the uppermost portion of the fiber 14 at the apex of the bend. Any suitable tool may be included, including a knife blade, grinding wheel, or other appropriate instrument. In the cleaving operation, a surface 28 of the fiber 14 is exposed, and is still surrounded by the resin 22 except at the exposed upper edge.

The upper, exposed surface 28 of the fiber 14 is then polished by appropriate polishing techniques known in the art, the precise nature of which will depend upon the particular composition of the optical fiber.

After the surface 28 has been polished, coating 30 is applied as illustrated by FIG. 4. This coating may be applied by vacuum or vapor deposition techniques or by a simple painting process, or other similar techniques known for mirroring surfaces.

After the coating has been applied, the resin is then removed, and the fiber will have the shape illustrated in FIG. 5, with the mirror coating 30 thereon. Removal of the resin is preferably accomplished by dissolution in an appropriate solvent for the resin.

At this point, the optical fiber may be removed from the channels 10 and 12, and may be wrapped with a protective coating or covering if desired.

Usually optical fibers are themselves a composite including a light transitting core and a protective cladding thereon. Such a fiber which has been bent in accordance with the present invention is shown on a greatly enlarged scale in FIGS. 6 and 7, wherein the fiber is generally designated 14, and includes the optically transmitting core 32 and the protective cladding 34. The further enlarged portion as seen in FIG. 7 illustrates the mirrored surface 30, and a typical light path is shown by the arrow 36, whereby the light passes through the core 32 of the fiber 14, contacts the mirrored surface, and is reflected along the core, without significant attenuation resulting from the sharp bend in the fiber and without leaving the fiber as could otherwise occur at the apex of a sharp bend.

Referring now to FIGS. 8-13 of the drawings, one embodiment of an apparatus for carrying out the bending process will now be described. The apparatus generally designated 40 is seen to include a pair of plates 42 and 44 which are generally rectangular, connected by a suitable hinge 46. The plates 42 and 44 have hollowed out cavities 48 and 50 respectively, and the cavity 48 in plate 42 is defined by the walls 52, 54, 56 and 58. Likewise, the cavity 50 is defined by the walls 60, 62, 64, and 66, similarly configured to the walls defining the cavity 48. The angles between the walls 52 and 54, 56 and 58, 60 and 62, and 64 and 66 are such as to be capable of accomodating the range of bends to be produced in the fibers. Typically such angles would range from straight, i.e. about 160°, down to 90° or less.

Plate 42 includes raised portions 68, 70 and 72, which form the hollowed out cavity 48 and the plate 44 includes corresponding raised portions 74 and 78 and a recess 76. When the plates 42 and 44 are hinged together, the respective surfaces 68 and 74, 70 and 76, and 72 and 78 come into face-to-face abutting contact, as seen by the dotted line position in FIG. 9. The cavities 48 and 50 then form cooperatively a single cavity.

The raised portions 68 and 72 are shaped such as to allow the cavity 48 to have an opening 80, and similarly, and similarly, an opening 82 is provided in the cavity 50. Again when the two plates 42 and 44 are hinged together, the partial openings 80 and 82 form a single opening into the composite mold cavity.

In one of the plates, plate 42 as shown, there are provided two fiber channels 84 and 86. The channels 84 and 86 are pivotally connected to the walls 54 and 56 respectively by means of a pivot pin 88 and 90 which rest in slots 92 and 94 in the plate 42. Additionally, a further connecting link 96 may be provided and would include a projection which travels in slots 98 within the fiber channels 84, 86. In this manner, the fiber channels 84 and 86 may pivot in the cavity 48. This construction allows adjustment of the angle between the fiber channels 84 and 86. As seen in FIG. 10 on an enlarged scale, one of the pins 90 is shown and includes an enlarged head 100 which is positioned in a slot in the plate 42, and pivotally connects the fiber channel 86.

The fiber channels 84 and 86 are shown in cross section in FIGS. 11 and 12. Typically, these channels would include channel halves 102 and 104. One of the halves, for instance 102, would have a pair of enlarged bosses 106 on opposite sides thereof, and the other channel half, 104, would include receiving portions 108 for the bosses 106. These fiber channels are preferably made from a resilient plastic material, for instance extruded polyethylene, such that they are capable of some flexure. By virtue of the construction shown, downward pressure at the center of the channel half 104, as illustrated by the arrow 110 in FIG. 12, would result in the portions 108 spreading apart, whereby the channel half 104 can be separated from the half 102, thus opening the channel to receive an optical fiber 14. The internal diameter of the fiber channels should be sufficiently great to receive the largest fiber or fiber bundle anticipated and also to include an additional area to accommodate the resin to be cast around the fiber.

For use of the apparatus, the fiber channels 84 and 86 are opened in the manner illustrated in FIGS. 11 and 12, and an optical fiber 14 is placed therein. Then, the channels 84 and 86 are closed and may be adjusted to the desired angle, and the plates 42 and 44 are hinged together to the dotted line position shown in FIG. 9. At this point, it may be necessary to move the optical fiber so that it projects slightly from the opening 80, 82. To accomplish this, a pulling or hooking device such as shown in FIG. 13 may be provided. Device 110 is seen to include a handle portion 112 and a hook 114 on the opposite end thereof. This device may then be inserted through the opening 80, 82 to engage the fiber and pull it slightly out of the opening, in order that it may be worked as discussed above.

With reference to FIGS. 14 through 17, several embodiments are shown for positioning the fiber channels and for determining the angle of the fiber channels, and accordingly the angle of the bend to be produced in the fibers. With respect to FIGS. 14 and 15, plate 120 similar to plate 42 of the device of FIG. 8, is provided with a pair of slots 122. The fiber channels 124 have a pointer arm 126 attached thereto by means of a shaft portion which passes through the slots 122. A pointer 128 on the distal end of the pointer arm 126 is provided. The plate 120 is provided with a scale 130 on the outer surface thereof, such that the pointer 128 will indicate the angle of the channel 124 on the scale 130. Thus, as the channel 124 is moved to the desired angle, the angle may be read directly from the scale 130. In this manner, the angle of the fiber bend is the sum of the angles read by the two pointers.

Figure 16:
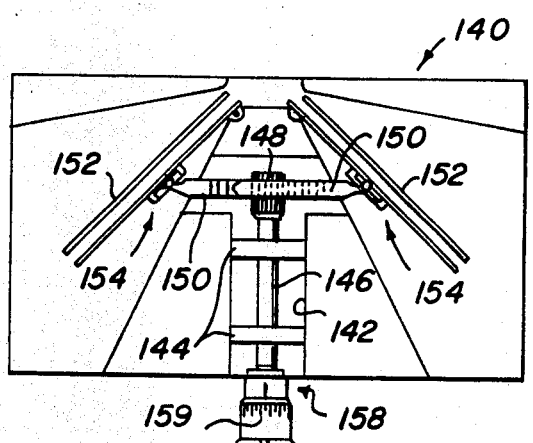
FIG. 16 is a plan view of an alternative angle measuring device.

In a further embodiment as illustrated in FIG. 16, a plate 140 (similar to plate 42) which carries the fiber channels is provided with an additional cavity 142. Cavity 142 is provided with a pair of bosses 144 which in turn support a central shaft 146 which carries on one end a pinion gear 148. A pair of rack gears 150 are on opposite sides of pinion 148 and connect to fiber channels 152 by a pin and slot connection 154 such that rotation of the pinion gear 148 will cause the rack gears 150 to move in opposite directions, thereby simultaneously moving both of the fiber channels 152. The other end of the shaft 146 is connected to a conventional micrometer adjustment means 158, whereby rotation of the micrometer will change the angle of the fiber channels 152, and provide a read-out of this angle on the indicia 159.

Figure 17:
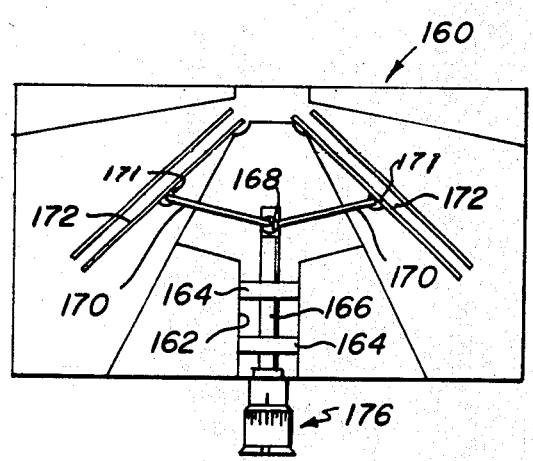
FIG. 17 is a plan view of still a further angle measuring device.

Still another variation is shown in FIG. 17, wherein one of the plates generally designated 160 (similar to plate 42) includes an additional hollowed out portion 162 including bosses 164 for supporting a shaft 166. Shaft 166 is provided with a fine screw thread, and carries an internally threaded collar 168. Attached to the collar 168 are a pair of link arms 170 which in turn are connected to fiber channels 172 by bosses 171. The threaded shaft 168 also includes a micrometer type adjustment 176, such that rotation of the micrometer 176 will cause the threaded collar 168 to move along the shaft 166, thereby changing the angle of the fiber channels 172, and providing a direct readout of that angle. An alternative could also be provided wherein the micrometer knob would rotate threadedly upon the shaft so that the shaft would only translate and not rotate, with appropriate connection to the plates.

Figure 18:
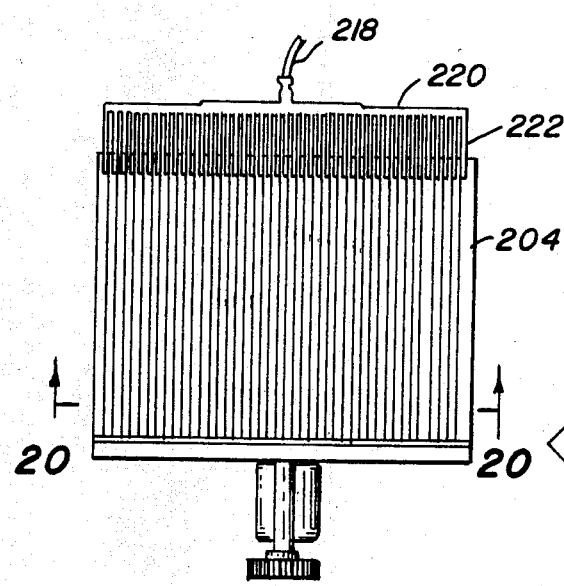
FIG. 18 is a plan view of another embodiment of the bending apparatus.
Figure 19:
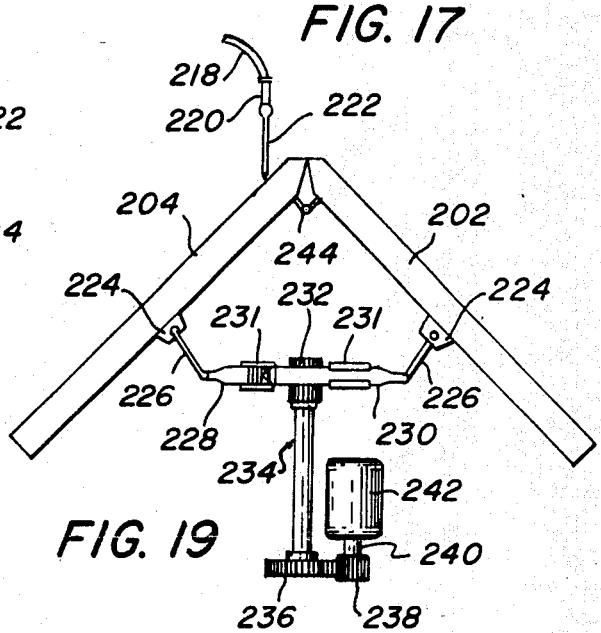
FIG. 19 is a side elevation view of the device of FIG. 18.
Figure 20:
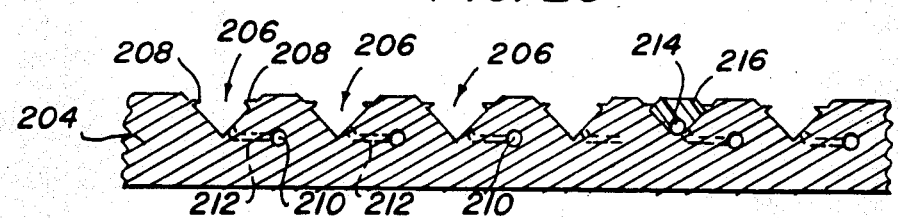
FIG. 20 is a sectional view along lines 20—20 of FIG. 18 and viewed in direction of the arrows.

The embodiment of FIGS. 18-20 is adapted for larger scale bending of optical fibers, whereby a number of fibers may be bent to the same angle at the same time. Embodiment, two plates 202 and 204 are provided and have the fiber channels directly formed therein. A plurality of V-shaped notches 206 are provided in one surface of each of the plates 202 and 204, these notches forming the fiber channels. The notches include barb-like projections 208 on each side thereof, and these projections 208 may be either continuous along the length of the notch 206 or may be intermittent. A plurality of passageways extend through the plates, with periodic transverse passageways 212 into the bottom of the notches 206. The passageways 210 may be connected to a vacuum pump for a purpose as will be explained.

An optical fiber 214 is placed in the notches 206, and by actuating the vacuum pump, the optical fiber is held in the notch 206. After the resin 216 is cast around the fiber 214, the vacuum pump may be turned off, and at this point the projections 208 acting on the resin 216 serve to hold the composite in place in the notches 206. The resin 216 may be supplied through a feed line 218 connected to a manifold 220 with a plurality of nozzles 222, one such nozzle for each of the fiber channels 206. One possible mechanism is shown for adjusting the angles of the plates 202 and 204, and is seen to include a boss 224 on the underside of each of the plates 202, 204. A connecting link 226 serves to connect the bosses 224 with rack gears 228 or 230. Rack gears 228 and 230 and corresponding supports 231 are positioned on opposite sides of a pinion gear 232, such that rotation of the pinion gear 232 will move the rack gears 228 and 230 in opposite directions.

Pinion gear 232 is mounted on a pinion shaft 234, which includes a gear 236 on the other end thereof. Gear 236 is driven by a pinion 238 mounted on the output shaft 240 of a stepping motor 242. In this manner, actuation of the stepping motor 242 will incrementally actuate the gear train and adjust the relative angles of the plates 202 and 204, by virtue of their hinge connection 244. The motor 242 of course is reversible, and may be provided with a digital analog readout indicative of the angle between plates 202, 204 achieved by rotation of the motor.

While this invention has been described as having certain preferred features and embodiments, it will be understood that it is capable of still further modification and variation, without departing from the spirit of the invention. Accordingly, this application is intended to cover any and all variations, modifications,, and adaptations of the invention which fall within the spirit of the invention and the scope of the accompanying claims.

I claim:

1. An apparatus for producing bends in optical fibers comprising a pair of plates hingedly connected along one edge of each of said plates so that said plates are capable of lying in face-to-face contact and are capable of being hingedly separated from each other, means defining a cavity between said plates. When the plates are in face-to-face contact, said cavity having two portions defined in it for receiving lengths of a fiber and an encapsulated resin for said fiber on opposite sides of a bend to be formed, said portions being joined at an apex section, means defining an opening into said cavity at said apex section, a fiber channel in each of said portions, said fiber channels being mounted in said portions for relative movement in said cavity to a desired bend angle while the apex of said desired angle is positioned at said opening in said apex section, and pulling means for acting on a resin-encapsulated optical fiber in said channels when said plates are in face-to-face contact and thereby positioning a resin-encapsulated fiber at said desired angle whereby the apex of the bend of said fiber is accessible through said opening and means for providing said fiber encapsulating resin.

2. An apparatus as in claim 1 and wherein said fiber channels comprise conduits pivotally attached to one of said plates.

3. An apparatus as in claim 2 and wherein said conduits each comprise a pair of semi-tubular sections.

4. An apparatus as in claim 3 and wherein said semi-tubular sections include means for releasably connecting said semi-tubular sections whereby an optical fiber may be enclosed in said semi-tubular sections.

5. An apparatus as in claim 2 and including means for measuring the angle between said conduits.

6. An apparatus as in claim 5 and including positive drive means for moving said conduits to a desired angle.

7. An apparatus as in claim 6 and wherein said positive drive means comprises a pair of rack gears, one connected to each of said conduits and a pinion gear drivingly associated with said pair of said rack gears.

8. An apparatus as in claim 7 and wherein said measuring means comprises a micrometer adjustment connected to said pinion gear.

9. An apparatus as in claim 6 and wherein said positive drive means comprises a threaded shaft, an internally threaded collar threadedly engaged on said shaft, a pair of links connecting said collar and said conduits, whereby rotation of said shaft moves said collar and adjusts the angle between said conduits.

10. An apparatus as in claim 9 and wherein said measuring means comprises a micrometer adjustment connected to said shaft.

11. An apparatus for producing bends in optical fibers comprising a pair of plates hingedly connected along one edge of said plates, optical fiber channels formed in each of said plates the channels including means for receiving a fiber encapsulated resin therein, means for securing an encapsulated optical fiber in said channels, means for moving said channels for bending said encapsulated optical fibers secured in said channels to a predetermined angle, said channels being so positioned with respect to each other as to permit access to the encapsulated optical fibers at an apex designed by the intersection of the axes of the channels and means for providing said fiber encapsulating resin.

12. An apparatus as in claim 11 and wherein said plates each have a plurality of said optical fiber channels formed therein.

13. An apparatus as in claim 12 and wherein the channels in each plate are substantially parallel to each other and substantially normal to said one edge of said plates.

14. An apparatus as in claim 11 and wherein said securing means comprises a plurality of barb-like projections in said channels.

15. An apparatus as in claim 11 and wherein said moving means comprises positive drive means.

16. An apparatus as in claim 15 and wherein said positive drive means includes an electric stepping motor.

17. An apparatus as in claim 11 wherein the means for providing is a means for filling said channels with a resin for encapsulating optical fibers therein.

18. An apparatus as in claim 16 and including means for producing a vacuum in said channels for holding said optical fibers therein.

* * * * *